United States Patent
Durazzo et al.

(10) Patent No.: US 12,411,621 B2
(45) Date of Patent: Sep. 9, 2025

(54) INTELLIGENT CLASSICAL/QUANTUM EXTENDED MEMORY FABRIC

(71) Applicant: Dell Products L.P., Round Rock, TX (US)

(72) Inventors: Kenneth Durazzo, Morgan Hill, CA (US); Stephen J. Todd, North Andover, MA (US); Michael Robillard, Shrewsbury, MA (US); Victor Fong, Melrose, MA (US); Brendan Burns Healy, Whitefish Bay, WI (US); Eric Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 648 days.

(21) Appl. No.: 17/811,242

(22) Filed: Jul. 7, 2022

(65) Prior Publication Data

US 2024/0012570 A1   Jan. 11, 2024

(51) Int. Cl.
*G06F 9/50* (2006.01)
*G06F 3/06* (2006.01)
*G06N 10/60* (2022.01)

(52) U.S. Cl.
CPC .......... *G06F 3/0629* (2013.01); *G06F 3/0604* (2013.01); *G06F 3/068* (2013.01); *G06N 10/60* (2022.01)

(58) Field of Classification Search
CPC ......... G06F 9/50; G06F 9/5016; G06F 9/5044
See application file for complete search history.

(56) References Cited

U.S. PATENT DOCUMENTS

| | | |
|---|---|---|
| 2001/0032029 A1 | 10/2001 | Kauffman |
| 2005/0288030 A1 | 12/2005 | Choi et al. |
| 2008/0116449 A1 | 5/2008 | Macready et al. |
| 2009/0122706 A1 | 5/2009 | Alfano et al. |
| 2012/0192168 A1 | 7/2012 | Funaoka et al. |
| 2014/0229221 A1 | 8/2014 | Shih et al. |
| 2016/0163311 A1 | 6/2016 | Crook et al. |
| 2017/0187796 A1 | 6/2017 | Bragstad et al. |
| 2017/0364450 A1 | 12/2017 | Struttmann |
| 2017/0364702 A1 | 12/2017 | Goldfarb et al. |
| 2019/0182119 A1 | 6/2019 | Ratkovic et al. |

(Continued)

OTHER PUBLICATIONS

Weder et al., Automated Quantum Hardware Selection for Quantum Workflows, Apr. 20, 2021, Electronics, MDPI, 1-18, 10, 984, https://www.mdpi.com/journal/electronics.

(Continued)

*Primary Examiner* — Andy Ho
(74) *Attorney, Agent, or Firm* — Workman Nydegger

(57) ABSTRACT

One example method includes receiving a hybrid/classical algorithm, determining a runtime characteristic of the hybrid/classical algorithm, based on the runtime characteristic, checking a memory availability for execution of the hybrid/classical algorithm, when adequate memory is not available to support execution of the hybrid/classical algorithm, modifying a classical/quantum memory fabric to provide enough memory to support execution of the hybrid/classical algorithm, and orchestrating the hybrid classical/quantum algorithm to an execution environment that includes the classical/quantum memory fabric.

20 Claims, 3 Drawing Sheets

(56) References Cited

U.S. PATENT DOCUMENTS

| | | | |
|---|---|---|---|
| 2019/0286774 A1 | 9/2019 | Nannicini et al. | |
| 2019/0370407 A1 | 12/2019 | Dickie | |
| 2021/0132757 A1 | 5/2021 | Golub | |
| 2021/0406151 A1* | 12/2021 | Durazzo | G06N 10/80 |
| 2022/0058052 A1 | 2/2022 | Birnbaum et al. | |
| 2023/0196157 A1* | 6/2023 | Jin | G06N 10/20 706/62 |
| 2023/0229514 A1 | 7/2023 | Pinho et al. | |

OTHER PUBLICATIONS

"Diffusion models explained. How does OpenAI's GLIDE work?", Accessed Oct. 2022, https://www.youtube.com/watch?v=344w5h24-h8&ab_channel=AICoffeeBreakwithLetitia.

Covalent, https://www.covalent.xyz/, 2023.

IBM Qiskit, Transpiler, 2023, https://docs.quantum.IBM.com/api/qiskit/transpiler.

Qiskit Dell Runtime, 2022, https://github.com/qiskit-community/qiskit-dell-runtime.

Killoran, N., et al., "What would you do with 1000 QPUs?," retrieved at https://medium.com/xanaduai/what-would-you-do-with-1000-qpus-4d6b91eccb69, Feb. 18, 2020, pp. 9.

Laymann F. et al, "Hybrid Quantum Applications Need Two Orchestrations in Superposition: A Software Architecture Perspective," ArXi, 2021, pp. 1-15.

Salm M. et al, "A Roadmap for Automating the Selection of Quantum Computers for Quantum Algorithms.," Communications in Computer and Information Science, vol. 1310, 2020, pp. 66-85.

Sim S. et al, "A framework for algorithm deployment on cloud-based quantum computers," ArXiv, 2018, pp. 1-10.

Weder B. et al, "Integrating quantum computing into workflow modeling and execution," in Proceedings—2020 IEEE/ACM 13th International Conference on Utility and Cloud Computing, 2020, pp. 1-14.

Weder B. et al, "The Quantum software lifecycle," in—Proceedings of the 1st ACM SIGSOFT International Workshop on Architectures and Paradigms for Engineering Quantum Software, 2020., pp. 1-8.

Wild K. et al, "TOSCA4QC: Two Modeling Styles for TOSCA to Automate the Deployment and Orchestration of Quantum Applications," in Proceedings—2020 IEEE 24th International Enterprise Distributed Object Computing Conference, 2020, pp. 1-11.

Xanadu, "PennyLane," Quantum machine learning, Retrieved at https://pennylane.ai/qml/, Retrieved on Mar. 2022, pp. 1-2.

Zapata, "Orquestra," Retrieved at https://docs.orquestra.io/, Retrieved on 2021, p. 1.

* cited by examiner

INTELLIGENT CLASSICAL/QUANTUM EXTENDED MEMORY FABRIC

RELATED APPLICATION

This application is related to U.S. patent application Ser. No. 17/648,065, entitled INTELLIGENT ORCHESTRATION OF CLASSIC-QUANTUM COMPUTATIONAL GRAPHS, filed 14 Jan. 2022, and incorporated herein in its entirety by this reference.

FIELD OF THE INVENTION

Embodiments of the present invention generally relate to memory fabrics which may be classical and/or quantum in nature. More particularly, at least some embodiments of the invention relate to systems, hardware, software, computer-readable media, and methods for statically, and dynamically, changing a memory space configuration to accommodate current and future needs.

BACKGROUND

Quantum algorithms may comprise a combination of classical and quantum components, that is, components which are intended to be executed on, respectively, classical computing infrastructure, and quantum computing infrastructure. At times, there may be a need to simulate the execution of such quantum algorithms. This execution may involve multiple iterations of the quantum algorithm in order to obtain the desired results. Thus, the quantum algorithm may be referred to as being an end-to-end quantum algorithm.

When an end-to-end quantum simulation request is submitted for a relatively complex quantum algorithm, it is possible that a server could fail to have a node with sufficient memory space to execute the simulation of individual circuits within that quantum algorithm. More particularly, when a computing cluster is set up for hybrid classical/quantum system, each individual node may not have enough memory space to execute a simulation of a specified quantum circuit.

Further, manual memory space configuration using existing solutions for each circuit would be too time consuming, because there are many circuit executions in an end-to-end algorithm. As well, manual configuration of the memory space to suit the quantum algorithm would require pausing the algorithm execution while memory space configuration decisions are made and implemented. Thus, efficient execution, and completion, of the algorithm is prevented.

Another problem is that a system may run out of memory in the middle of an expensive quantum algorithm execution run. Thus, the algorithm would have to be stopped until suitable memory is made available. Again, such an approach would prevent the efficient execution and completion of the algorithm.

Further, a memory fabric may comprise both local and remote memory regions. However, remote memory has a different latency than local memory. Thus, it may be difficult to determine which qubit to assign to which memory region.

Finally, it is also possible that the memory requirements of a quantum algorithm may not be known a-priori or may be underestimated. As a result, it may be difficult to determine how much memory to allocate to the quantum algorithm, and when to allocate that memory.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
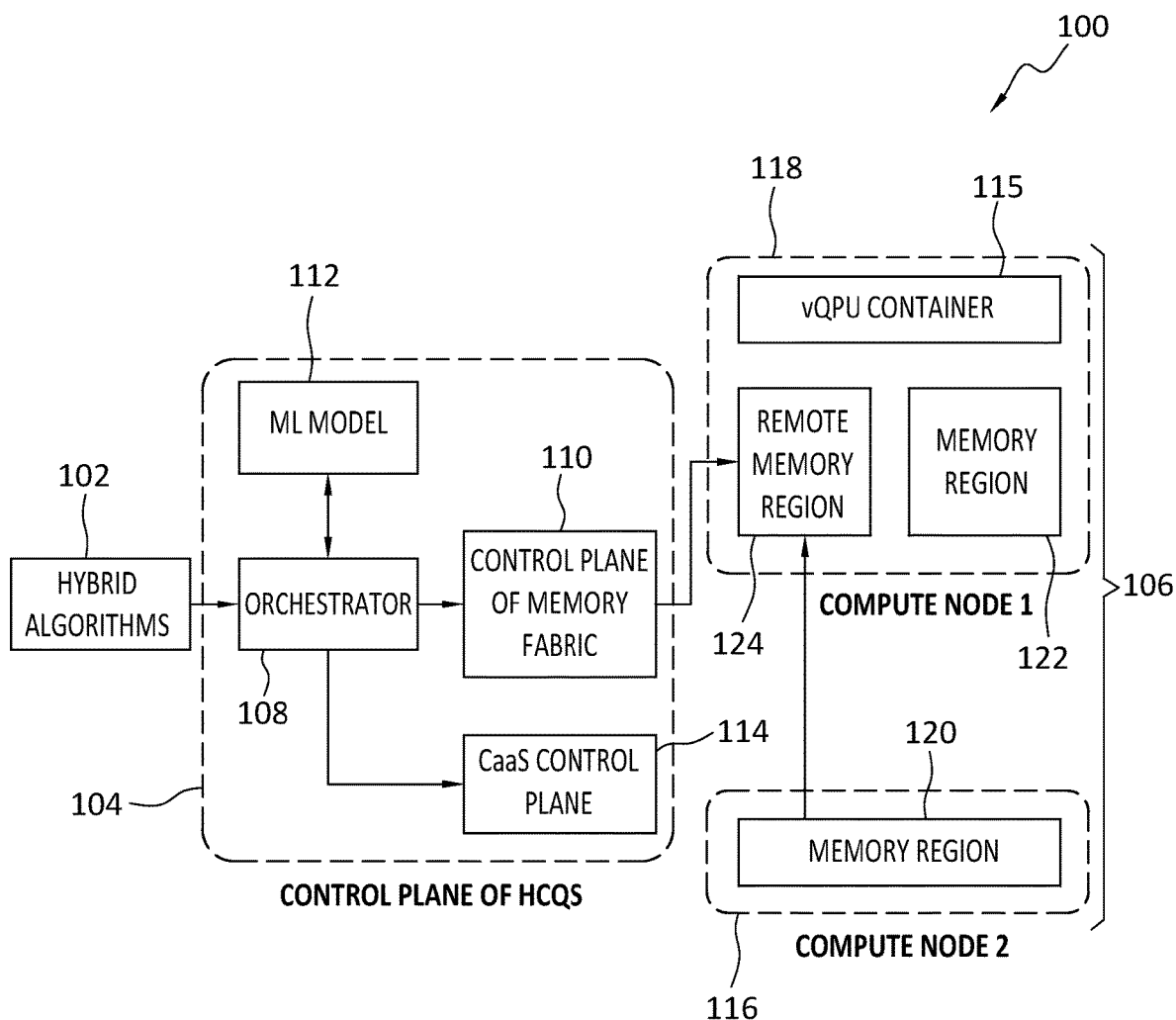
FIG. 1 discloses aspects of an example architecture according to some embodiments.

Embodiments of the present invention generally relate to memory fabrics which may be classical and/or quantum in nature. More particularly, at least some embodiments of the invention relate to systems, hardware, software, computer-readable media, and methods for statically, and dynamically, changing a memory space configuration to accommodate current and future needs.

In general, some example embodiments of the invention may provide for prediction of a memory requirement for supporting the execution of quantum simulations, that is, the running of a quantum algorithm on classical infrastructure, or on a combination of classical and quantum infrastructure. These simulations may involve the execution of algorithms, which may be generally referred to herein as 'quantum algorithms,' that comprise, or consist of, quantum elements. Examples of such quantum algorithms include, but are not limited to, hybrid classical quantum (HCQ) algorithms that may include both classical, and quantum, executable elements.

As well, some example embodiments may provide for the expansion, based on such a prediction, of the memory available to support the execution of the quantum algorithm. In embodiments, the memory prediction and/or expansion may be performed statically, that is, prior to the initiation of the execution of the quantum simulation. Further, in embodiments, the memory prediction and/or expansion may be performed dynamically, that is, while the quantum simulation is running.

In the case of static memory requirement prediction and expansion, which may be performed automatically, example embodiments may operate to extend the size of the largest memory space available using software-defined OS modules, examples of which include a persistent memory filesystem (PMEM-FS), or hardware-based memory, examples of which include Ultra Path Interconnect (UPI). This static analysis may then enable an enlargement of the space of possible memory configurations available to the orchestrator, expanding the ability of the memory to handle large quantum simulation jobs directed to it by the orchestrator.

With regard to dynamic memory requirement prediction and expansion, which may be performed automatically, example embodiments may operate to extend the amount of memory available dynamically by recognizing system memory pressure and allocating more memory, dynamically, under various conditions. For example, dynamic allocation of memory may be performed prior to the quantum simulation execution heap signaling that it is out of memory. As well, dynamic allocation of memory may be performed prior to decreased quantum simulation performance such as may result from excessive memory swapping.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, an embodiment may help to ensure that adequate memory is available before, and during, execution of a quantum simulation. An embodiment may reduce, or eliminate, the need to pause or stop the execution of a quantum simulation due to a lack of adequate memory to support the execution. An embodiment may reduce, or eliminate, the need for manual memory space configuration. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

With particular attention now to FIG. 1, an example operating environment 100, which may comprise an HCQS (Hybrid Classical/Quantum System), is disclosed which may comprise both classical, and quantum, hardware and software, which may be operable to execute HCQ algorithms that include both classical, and quantum, executable components.

In the example operating environment 100, hybrid classical/quantum (HCQ) algorithms 102 may be provided to a control plane 104. The HCQ algorithms 102 may comprise both classical, and quantum, executable elements. The control plane 104 may operate to ensure that the size of an extended memory fabric 106 is adequate to support execution of simulations of the HCQ algorithms 102. As noted earlier, adjustments to the memory resources and capabilities of the extended memory fabric 106 may be made prior to, and/or during, execution of an HCQ algorithm 102.

An extended memory fabric, or simply 'memory fabric,' according to example embodiments, may include both classical memory elements, and quantum memory elements. The classical, and quantum, memory elements may be used, for example, to support the execution of quantum algorithms.

Note that as used herein, 'classical' includes, but is not limited to, computing systems, components, and operations, that may be concerned with, and may be operable to execute, non-quantum elements of an algorithm. On the other hand, 'quantum' includes, but is not limited to, quantum computing systems, components, and operations, that may be concerned with, and may be operable to execute, quantum elements of a quantum algorithm.

In more detail, the control plane 104 may comprise a control plane of an HCQS (hybrid/classical quantum system) and may include, for example, an orchestrator 108 that may communicate with, among other entities, a control plane 110 of the memory fabric 106. The control plane 104 may further comprise an ML model 112 which may be operable to predict runtime characteristics for the HCQ algorithms 102 such as, but not limited to, memory usage. The orchestrator 108 may also operate with a CaaS (container as a service) control plane 114 to ensure adequate containers or other execution platforms are, or will be, available for execution of, at least, any classical elements of the HCQ algorithms 102. One such container may be a vQPU container 115. As used herein, a 'vQPU' container may comprise a container with classical software that emulates a QPU container.

The extended memory fabric 106 need not have any particular configuration and may comprise, for example, any number of compute nodes 116 and 118. The compute nodes 116 and 118 may each comprise a respective memory region 120 and 122 that may be available, or made available, to support execution of the HCQ algorithms 102. Access to, and communication with, the memory regions 120 and 122, such as by the orchestrator 108, may be by way of the control plane 110 of the extended memory fabric 106. The compute node 118 may comprise, in addition to the memory region 122, a remote memory region 124 that may be accessible, such as for read and write purposes for example, by the memory region 120.

B. Operational Aspects of Some Example Embodiments

With continued reference to FIG. 1, attention is directed now to operational aspects of some example embodiments of the invention. These are presented by way of example, and are not intended to limit the scope of the invention in any way.

B.1 Static Evaluation of a Hybrid Algorithm

When an HCQS (Hybrid Classical/Quantum System), such as may include any or all of the various components disclosed in FIG. 1, needs to execute an HCQ algorithm 106, each simulated quantum circuit execution associated with the HCQ algorithm 106 may first be evaluated by a machine learning model such as the ML model 112, examples of which are disclosed in the 'Related Application' referred to herein, to predict runtime characteristics for the algorithm, such as memory usage for example.

The HCQS, and specifically, the orchestrator 108, may determine if any compute node available, such as the compute nodes 116 and 118 for example, has, or will have, sufficient memory space, such as the memory regions 120 and 124, to simulate execution of an HCQ algorithm 102. If it is determined by the HCQS that there is, or will be, sufficient memory space, the HCQS may then execute, or cause the execution of, the quantum simulation on that compute node. If it is determined by the HCQS that there are multiple nodes with sufficient memory space, the ML model 112 may be used to select a particular node based, for example, on orchestration parameters associated with that node.

For example, the ML model 112, may be used to choose the best node for execution based on quantum simulation workload characteristics. Note that the growth of memory space used in quantum simulations may grow exponentially and may be determined by the quantum states needed to represent any entangled qubits that will be used to execute the simulation. For example, in a maximum case in which all of the qubits are entangled, the size of the necessary memory space may be expressed as $2^n$, where 'n' is the number of entangled qubits.

If there is no single node in the fabric 106 that can execute the quantum circuit simulation, but the sum of two or more nodes is more than expected memory usage, the orchestrator 108 of the HCQS may invoke the control plane 110 of the pre-configured memory fabric 106 to combine the memory space of the two or more nodes. The amount of memory allocated to the quantum circuit simulation may be based on memory usage prediction such as may be provided by one or more of the entities disclosed in the 'Related Application' referred to herein. After the memory configuration is completed, the quantum simulation may be orchestrated to the new logical execution environment for execution. As a result, computation may also be parallelized across the aggregated CPU resources, which may improve the performance of the execution of the quantum circuit simulation.

B.2 Dynamic Evaluation of a Hybrid Algorithm

The foregoing example relates to a situation in which the memory fabric 106 may be evaluated and modified, if necessary, in a static manner. That is, the evaluation and modification may take place before execution of the quantum simulation begins. In other circumstances however, evaluation and modification of the memory fabric 106 may take place before and/or during execution of the quantum simulation. For example, the HCQS 100 may dynamically monitor the quantum simulation execution heap and ensure that enough memory, such as high performance memory for example, is dynamically made available to the HCQ algorithm 102 prior to the HCQ algorithm 102 slowing down or crashing.

B.3 Related Factors

Note that embodiments may take into consideration quantum factors such as an entanglement characteristic of quantum computing qubits, and additional latency required for remote memory fabrics, which may be different for each node if memory region from multiple nodes are used. In some embodiments, these factors may be addressed by evaluating a quantum circuit of the HCQ algorithm 102 prior to execution of that HCQ algorithm 102.

For static circuit evaluation, such as by the orchestrator 108 for example, an embodiment may re-arrange, where possible, the quantum gates, or simply 'gates,' to group gates by the entangled qubits of those gates. In this regard, it is noted that reordering of gates may depend on commutation of respective unitary matrices. This should be possible in cases where there is no entanglement between those qubits, but if the qubits are both mutually entangled with other qubits unrelated to these exact gates, this entanglement may cause an issue that may prevent re-arrangement of the quantum gates. During the execution of a quantum circuit of the HCQ algorithm 102, groups of qubit states may, if remote, be paged in all together, the gates executed, and the groups of qubit states then paged out.

In more detail, when an embodiment is assessing a remote memory, a caching mechanism may be used to store the remote memory values in a local host memory. Paging and paging out refers to the notion that the memory values may be copied, or paged in, to the host, or will be otherwise transmitted to the host. The host may then perform an operation directly on the memory values, and then the values resulting after that execution may be paged back out to the remote memory. At least some embodiments of the invention may employ rearrangements of quantum gates to reduce, or eliminate, the need to page memory values in and out.

For example, suppose that there are independent operations on qubitA and qubitB, such as a sequence of steps similar to classical instruction execution. In this example, qubitA is executing instruction1, and qubitB is executing instruction2, and then the circuit is asking qubitA to execute instruction3. In this example, the overall execution will depend on qubitA for instruction1, qubitB for instruction2 and qubitA, again, for instruction3. To avoid the frequency of paging in and out, if the two qubits, that is, qubitA and qubitB, are independent of each other, meaning that they are not entangled with each other, embodiments may operate to rearrange the gate to execute instruction1, and then instruction3, on qubitA so that there is only one page in and one page out, total, for the two instructions that are executed by qubitA, and then execute instruction2 on qubitB. Since, in this example, qubitA and qubitB are independent of each other, rearrangement of the gate may be undertaken without negatively impacting the qubits. Following are some further observations concerning qubits.

First, and as noted above, qubits may be entangled together. Changing the state of one qubit by a gate will change the state of other entangled qubits as well. Further, while the ideal probability distribution of a given qubit may be biased by the state of another qubit, the result in sampling from that distribution is independent from the result of other qubits unless those qubits are actively entangled at the time of sampling, that is, the measuring of the qubit. As a consequence, one may consider blocks of qubits which are mutually 'independent' from other blocks, meaning no pair of qubits, one from each block, are entangled. Again, however, the Bloch vector, a representation of the idealized distribution, will still depend what happened to and by other qubits during the execution of the circuit. Finally, some hybrid algorithms may require parallel execution of multiple different circuits on the same iteration.

With continued attention to evaluation processes according to some embodiments, an evaluation may comprise one or more elements, the first (i) of which may be to determine whether there are sections or regions of the quantum circuit of an HCQ algorithm 102 that could be unentangled so that those regions could be used separately, and the second (ii) element of an evaluation may be to determine which qubits have the most execution, that is, are used most frequently. So, therefore, those qubits may receive the most instructions in the simulation execution, and may thus be placed within the memory region that is to be employed for execution of the HCQ algorithm 102. The classical memory region utilized for execution of the HCQ algorithm 102 may be that with the lowest latency.

That is, qubits that require the most execution and have the most entanglement should be placed in memory with the lowest latency. The rest of the groups of qubits may be arranged, where possible, in similar ways across the compute nodes of the memory fabric 106, and ordered by their respective latency. Note that when two qubits are not entangled, the order of execution of the quantum gates, or simply 'gates,' may be re-arranged between those qubits. However, when the two qubits are entangled, the order of execution of the gates cannot be rearranged between those two qubits, as each qubit affects the state of the other.

Thus, embodiments of the invention may evaluate a quantum circuit of an HCQ algorithm 102 by considering various characteristics of the quantum circuit. One of these is an entanglement characteristic associated with that quantum circuit, and another of the characteristics is an extent to which one or more qubits of the quantum circuit are utilized, or expected to be utilized, when the quantum circuit is executed as part of the simulation of an HCQ algorithm 102.

Finally, after an execution of a quantum circuit of a quantum algorithm is finished, it may be the case that the memory fabric 106 is not necessarily taken down by default. Rather, a determination may be made, such as by the orchestrator 108, as to the number of any future quantum simulation jobs to be executed, and a time delay, to determine if there are future jobs.

In more detail, suppose that in an HCS algorithm after the quantum simulation is finished executing, a result of one of the iterations of the quantum simulation may be sent back to the classical side for the classical side to perform some computation. During that time while the classical side is performing the computation, the quantum side may just sit idle. Depending on how much time the classical computation will require, it may make sense to completely tear down the memory fabric 106 so that another process can utilize the memory regions of the memory fabric 106. Alternatively, it may make sense to wait for a period of time, such as a few seconds for example, for the classical computation to finish, and then that result may be sent back to the memory fabric 106 so that the quantum side can continue the simulation. In the latter case, the memory fabric 106 may be preserved, rather than torn down. In general then, intelligence may be applied to determine whether, and when, a memory fabric 106 should be preserved, or torn down.

C. Example Methods

Figure 2:
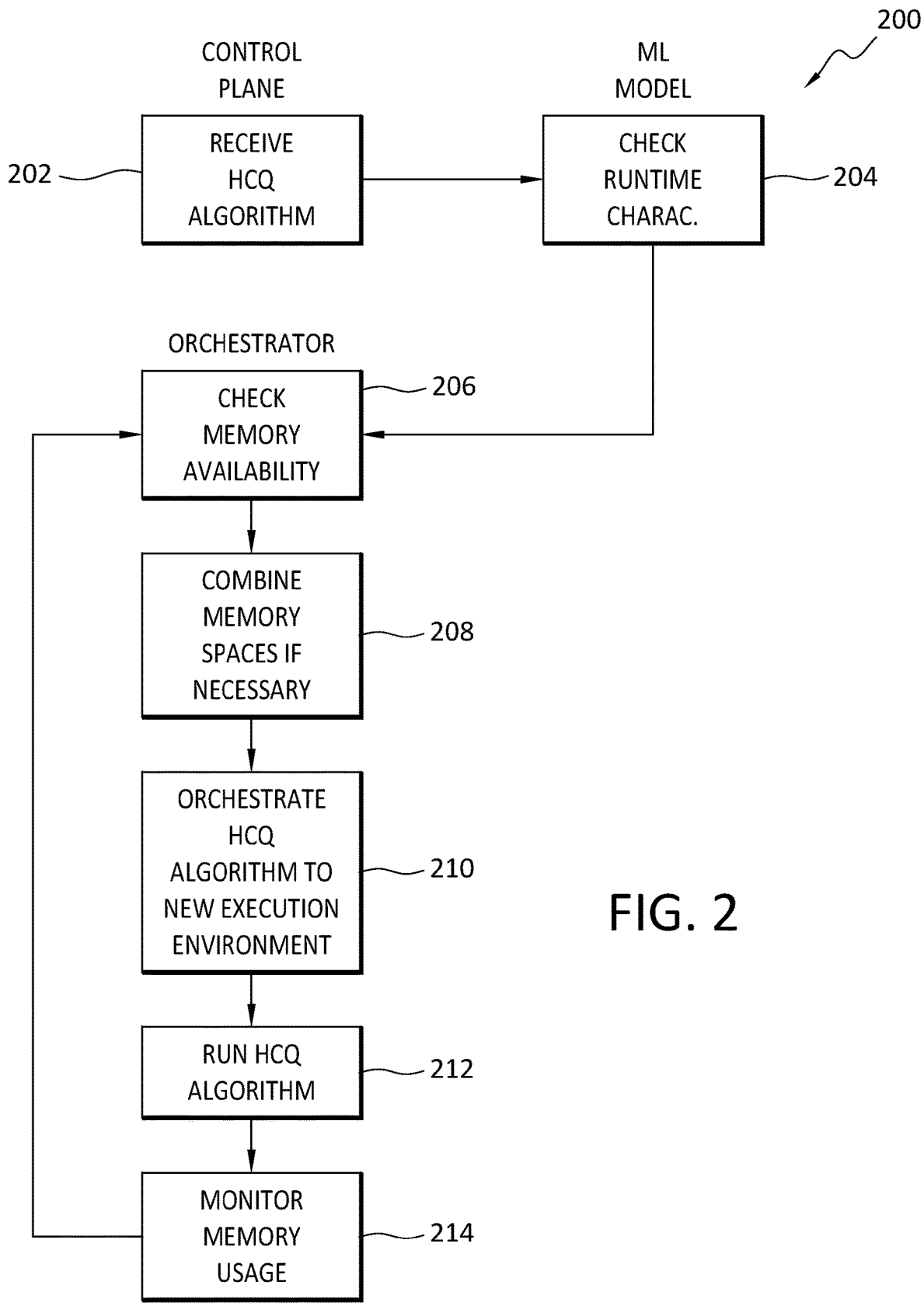
FIG. 2 discloses aspects of an example method according to some embodiments.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to some embodiments is denoted generally at 200. Part, or all, of the method 200 may be performed by, and/or at the direction of, an orchestrator, example embodiments of which are disclosed herein. The orchestrator may or may not be an element of an HCQS control plane that comprises other elements which may perform portions of the method 200. No particular functional allocation amongst entities is necessarily required however and, as such, FIG. 2 is presented by way of example and is not intended to limit the scope of the invention in any way.

The example method 200 may begin when an HCQ algorithm is received 202, such as at an HCQS control plane for example. A machine learning (ML) model, examples of which are disclosed in the 'Related Application' referred to herein, may then evaluate the runtime characteristics 204 of the HCQ algorithm. Such runtime characteristics may include, for example, an amount of memory expected to be used by execution of the HCQ algorithm.

The runtime characteristic information may be provided to an orchestrator which may then check 206 whether there is adequate memory available to support execution of the HCQ algorithm. If so, the method 200 may advance to 210, where the HCQ algorithm may be orchestrated to an execution environment that includes the memory. However, if the check 206 reveals that there is not adequate memory available to support execution of the HCQ algorithm, the orchestrator may combine available memory spaces 208 to define a new, or modified, memory fabric that includes memory resources adequate to support execution of the HCQ algorithm.

After the memory fabric has been created/updated, the HCQ algorithm may then be orchestrated 210 to an execution environment that includes the memory fabric. Once the HCQ algorithm has been orchestrated 210, the HCQ algorithm can then be run 212.

As indicated in FIG. 2, the usage of memory by the running HCQ algorithm may be monitored 214 in order to enable dynamic adjustments to the memory fabric to suit changing needs and conditions with respect to the running HCQ algorithm. Note further that the method 200, at least operations 202-210, may be performed prior to the running of the HCQ algorithm.

D. Further Example Embodiments

Following are some further example embodiments of the invention. These are presented only by way of example and are not intended to limit the scope of the invention in any way.

Embodiment 1. A method, comprising: receiving a hybrid/classical algorithm; determining a runtime characteristic of the hybrid/classical algorithm; based on the runtime characteristic, checking a memory availability for execution of the hybrid/classical algorithm; when adequate memory is not available to support execution of the hybrid/classical algorithm, modifying a classical/quantum memory fabric to provide enough memory to support execution of the hybrid/classical algorithm; and orchestrating the hybrid classical/quantum algorithm to an execution environment that includes the classical/quantum memory fabric.

Embodiment 2. The method as recited in embodiment 1, wherein the method is performed prior to execution of the hybrid classical/quantum algorithm.

Embodiment 3. The method as recited in any of embodiments 1-2, wherein the checking of a memory availability, and the modifying of the classical/quantum memory fabric, are performed while the hybrid classical/quantum algorithm is running.

Embodiment 4. The method as recited in any of embodiments 1-3, wherein after the orchestrating, the hybrid classical/quantum algorithm is executed, and the hybrid classical/quantum algorithm is monitored while running.

Embodiment 5. The method as recited in any of embodiments 1-4, wherein execution of the hybrid classical/quantum algorithm is parallelized over a portion of the classical/quantum memory fabric.

Embodiment 6. The method as recited in any of embodiments 1-5, wherein the modifying of the classical/quantum memory fabric comprises one or both of: rearranging quantum gates to group the quantum gates according to an entanglement characteristic; and, placing qubits most frequently used relative to other qubits, and with a greatest entanglement relative to the other qubits, in memory of the classical/quantum memory fabric with a lowest latency.

Embodiment 7. The method as recited in any of embodiments 1-6, wherein, after execution of the hybrid quantum/classical algorithm, a check is performed to determine whether or not the memory fabric should be torn down, or retained.

Embodiment 8. The method as recited in any of embodiments 1-7, wherein memory provided by the classical/quantum memory fabric to the quantum/classical algorithm is automatically modified while the quantum/classical algorithm is running, to prevent slowing or crashing of the quantum/classical algorithm.

Embodiment 9. The method as recited in any of embodiments 1-8, wherein the checking of a memory availability, and the modifying of the classical/quantum memory fabric, are performed by an orchestrator of a hybrid quantum/classical system.

Embodiment 10. The method as recited in any of embodiments 1-9, wherein when a determination is made that a single node of the classical/quantum memory fabric has adequate memory resources to support execution of the hybrid classical/quantum algorithm, the hybrid classical/quantum algorithm is executed on that node.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
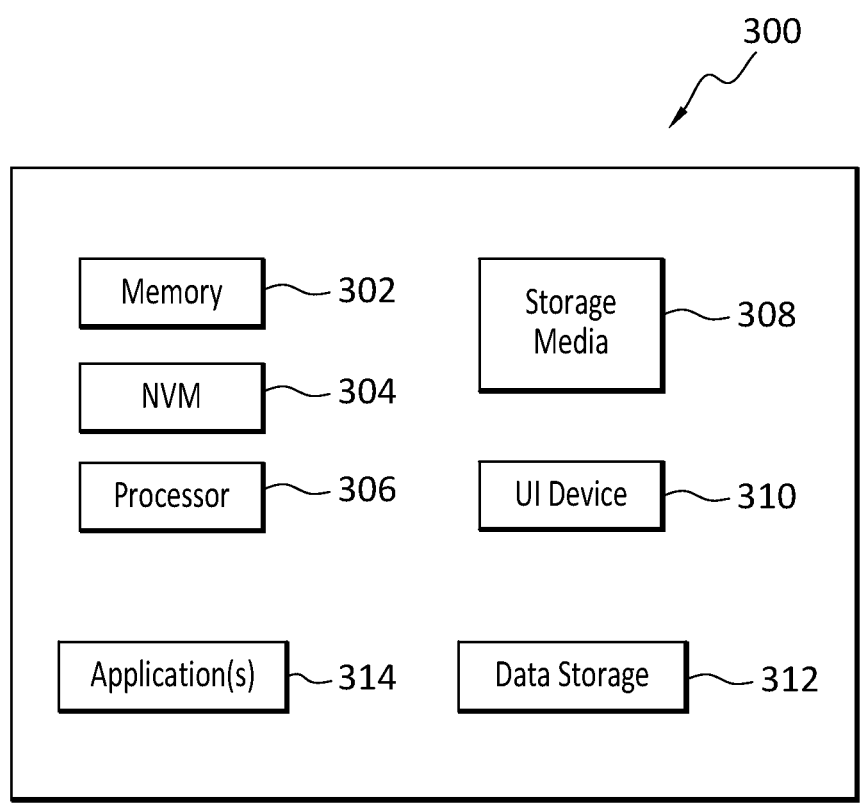
FIG. 3 discloses aspects of a computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a computing device, which may be physical in form, and one example of which is denoted at 300. As well, elements of the computing device 300, such as the memory 302 for example, may comprise classical, and/or quantum, computing elements.

In the example of FIG. 3, the computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a hybrid classical/quantum algorithm;
determining a runtime characteristic of the hybrid classical/quantum algorithm;
based on the runtime characteristic, checking a memory availability for execution of the hybrid classical/quantum algorithm;
when adequate memory is not available to support execution of the hybrid/classical hybrid classical/quantum algorithm, modifying a classical/quantum memory fabric to provide enough memory to support execution of the hybrid classical/quantum algorithm; and
orchestrating the hybrid classical/quantum algorithm to an execution environment that includes the classical/quantum memory fabric.

2. The method as recited in claim 1, wherein the method is performed prior to execution of the hybrid classical/quantum algorithm.

3. The method as recited in claim 1, wherein the checking of a memory availability, and the modifying of the classical/quantum memory fabric, are performed while the hybrid classical/quantum algorithm is running.

4. The method as recited in claim 1, wherein after the orchestrating, the hybrid classical/quantum algorithm is executed, and the hybrid classical/quantum algorithm is monitored while running.

5. The method as recited in claim 1, wherein execution of the hybrid classical/quantum algorithm is parallelized over a portion of the classical/quantum memory fabric.

6. The method as recited in claim 1, wherein the modifying of the classical/quantum memory fabric comprises one or both of: rearranging quantum gates to group the quantum gates according to an entanglement characteristic; and, placing qubits most frequently used relative to other qubits, and with a greatest entanglement relative to the other qubits, in memory of the classical/quantum memory fabric with a lowest latency.

7. The method as recited in claim 1, wherein, after execution of the hybrid classical/quantum algorithm, a check is performed to determine whether or not the classical/quantum memory fabric should be torn down, or retained.

8. The method as recited in claim 1, wherein memory provided by the classical/quantum memory fabric to the hybrid classical/quantum algorithm is automatically modified while the hybrid classical/quantum algorithm is running, to prevent slowing or crashing of the hybrid classical/quantum algorithm.

9. The method as recited in claim 1, wherein the checking of a memory availability, and the modifying of the classical/quantum memory fabric, are performed by an orchestrator of a hybrid quantum/classical system.

10. The method as recited in claim 1, wherein when a determination is made that a single node of the classical/quantum memory fabric has adequate memory resources to support execution of the hybrid classical/quantum algorithm, the hybrid classical/quantum algorithm is executed on that node.

11. A non-transitory storage medium having stored therein instructions that are executable by one or more hardware processors to perform operations comprising:
receiving a hybrid classical/quantum algorithm;
determining a runtime characteristic of the hybrid classical/quantum algorithm;
based on the runtime characteristic, checking a memory availability for execution of the hybrid classical/quantum algorithm;
when adequate memory is not available to support execution of the hybrid/classical hybrid classical/quantum algorithm, modifying a classical/quantum memory fabric to provide enough memory to support execution of the hybrid classical/quantum algorithm; and
orchestrating the hybrid classical/quantum algorithm to an execution environment that includes the classical/quantum memory fabric.

12. The non-transitory storage medium as recited in claim 11, wherein the operations are performed prior to execution of the hybrid classical/quantum algorithm.

13. The non-transitory storage medium as recited in claim 11, wherein the checking of a memory availability, and the modifying of the classical/quantum memory fabric, are performed while the hybrid classical/quantum algorithm is running.

14. The non-transitory storage medium as recited in claim 11, wherein after the orchestrating, the hybrid classical/quantum algorithm is executed, and the hybrid classical/quantum algorithm is monitored while running.

15. The non-transitory storage medium as recited in claim 11, wherein execution of the hybrid classical/quantum algorithm is parallelized over a portion of the classical/quantum memory fabric.

16. The non-transitory storage medium as recited in claim 11, wherein the modifying of the classical/quantum memory fabric comprises one or both of: rearranging quantum gates to group the quantum gates according to an entanglement characteristic; and, placing qubits most frequently used relative to other qubits, and with a greatest entanglement relative to the other qubits, in memory of the classical/quantum memory fabric with a lowest latency.

17. The non-transitory storage medium as recited in claim 11, wherein, after execution of the hybrid classical/quantum algorithm, a check is performed to determine whether or not the classical/quantum memory fabric should be torn down, or retained.

18. The non-transitory storage medium as recited in claim 11, wherein memory provided by the classical/quantum memory fabric to the hybrid classical/quantum algorithm is automatically modified while the hybrid classical/quantum algorithm is running, to prevent slowing or crashing of the hybrid classical/quantum algorithm.

19. The non-transitory storage medium as recited in claim 11, wherein the checking of a memory availability, and the modifying of the classical/quantum memory fabric, are performed by an orchestrator of a hybrid quantum/classical system.

20. The non-transitory storage medium as recited in claim 11, wherein when a determination is made that a single node of the classical/quantum memory fabric has adequate memory resources to support execution of the hybrid classical/quantum algorithm, the hybrid classical/quantum algorithm is executed on that node.

* * * * *

UNITED STATES PATENT AND TRADEMARK OFFICE
CERTIFICATE OF CORRECTION

| | | |
|---|---|---|
| PATENT NO. | : 12,411,621 B2 | Page 1 of 1 |
| APPLICATION NO. | : 17/811242 | |
| DATED | : September 9, 2025 | |
| INVENTOR(S) | : Kenneth Durazzo et al. | |

It is certified that error appears in the above-identified patent and that said Letters Patent is hereby corrected as shown below:

In the Claims

Column 11
Claim 1, Line 50, change "of the hybrid/classical hybrid classical/quantum" to – of the hybrid classical/quantum –

Column 12
Claim 11, Line 42, change "of the hybrid/classical hybrid classical/quantum" to – of the hybrid classical/quantum –

Signed and Sealed this
Twenty-third Day of December, 2025

John A. Squires
*Director of the United States Patent and Trademark Office*